(12) United States Patent
Ganesan et al.

(10) Patent No.: US 12,455,870 B2
(45) Date of Patent: Oct. 28, 2025

(54) DETECTION AND RESOLUTION OF CONCURRENCY RACE CONFLICTS ACROSS DATABASE REGION NODES

(71) Applicant: Capital One Services, LLC, McLean, VA (US)

(72) Inventors: Arunkumar Ganesan, McLean, VA (US); David Harmony, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/417,948

(22) Filed: Jan. 19, 2024

(65) Prior Publication Data
US 2025/0238413 A1 Jul. 24, 2025

(51) Int. Cl.
*G06F 16/23* (2019.01)

(52) U.S. Cl.
CPC ...... *G06F 16/2329* (2019.01); *G06F 16/2358* (2019.01); *G06F 16/2365* (2019.01)

(58) Field of Classification Search
CPC ............. G06F 16/2329; G06F 16/2358; G06F 16/2365
See application file for complete search history.

(56) References Cited

U.S. PATENT DOCUMENTS

| | | | |
|---|---|---|---|
| 11,630,838 B1 * | 4/2023 | Gujral | G06F 16/9024 707/625 |
| 2003/0054325 A1 * | 3/2003 | Miller | G06Q 10/109 434/108 |
| 2007/0203745 A1 * | 8/2007 | Bartsch | G16H 30/20 705/2 |

* cited by examiner

*Primary Examiner* — Kris E Mackes
(74) *Attorney, Agent, or Firm* — Foley & Lardner LLP

(57) ABSTRACT

Concurrency race conditions in a distributed database system may arise and manifest with cross-node write conflicts, in which different database nodes independently process requests for the same record stored in a database and assign the requests with a same sequence number for the same record. An example embodiment includes a distributed database system having database nodes configured to transmit, stream, and/or publish logs of respectively processed requests. A detection system or subsystem within the distributed database system monitors the logs for cross-node write conflicts. The detection system may lock the database record from further modification/manipulation, alert and requisition users to manually resolve the conflict, automatically resolve the conflict via a replaying of the conflicted requests, and predict whether the conflict was intentional, malicious, or part of a cyberattack on the distributed database system.

20 Claims, 5 Drawing Sheets

DETECTION AND RESOLUTION OF CONCURRENCY RACE CONFLICTS ACROSS DATABASE REGION NODES

BACKGROUND

Various techniques for distributed database deployment, including active/active deployment, provide high availability for a large population of users across a widespread area. According to such deployment configurations, a database platform or system includes multiple independent and isolated data centers or nodes that may each handle client requests, thereby distributing an overall system load and reducing latency for the client requests. However, these deployment configurations introduce the possibility of concurrency race conditions between different nodes or data centers, resulting in at least near-simultaneous write requests being incorrectly and erroneously processed (e.g., due to a lack of a central system that prevents data collisions from even occurring in the first place). This and other technical challenges must be addressed to ensure data accuracy of a distributed database.

SUMMARY

Embodiments described herein provide technical solutions for addressing concurrency race conditions that may occur in database deployments serving multiple clients via multiple distributed data centers or nodes. The disclosed solutions enable reliable detection of these problematic conditions, such that the data inaccuracy resulting therefrom may be swiftly resolved before propagating to downstream data dependencies. Due to the disclosed solutions enabling detection and resolution of concurrency race conditions, example embodiments of a database platform or system are able to support flexible uses thereof by its clients, and database clients have fewer restrictions (e.g., location/region restrictions, request volume limits, etc.) imposed thereon.

In some embodiments, the distributed nodes of a database system may each stream, to a detection system in the database system, logs of client requests that specify modifications to records stored by the database system. These client requests are locally and independently processed by the distributed nodes. The client requests are each assigned with sequence numbers relating to previous modifications for a record stored in the database system. The detection system monitors the streamed logs for at least two client requests processed by different distributed nodes within a time period of one another and having a same sequence number for a same record. Such requests may, for example, represent a cross-node conflict that manifests a concurrency race condition. When detecting an occurrence of such requests, the detection system may lock the record from further requests, resolve the cross-node conflict by determining corrected sequence numbers for the requests (and a correct state, value, cumulative modification, etc., to apply to the record), and unlock the record after a resolution of the conflict.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

Figure 1:
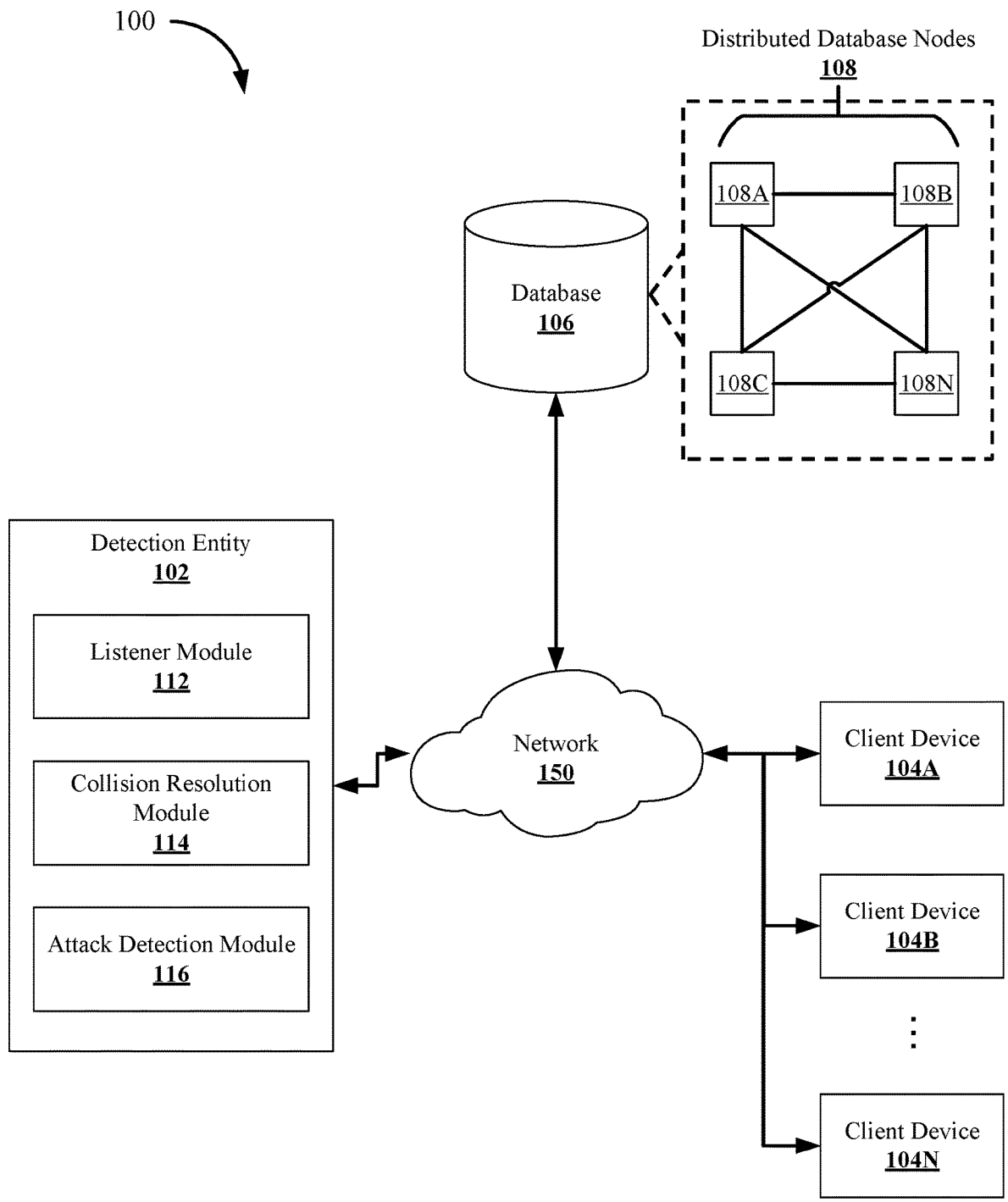
FIG. 1 shows an example system for detecting or resolving cross-node conflicts in distributed databases, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Embodiments described herein provide technical solutions for addressing concurrency race conditions or other conflicts, such as those that may occur in distributed database deployments serving multiple clients via multiple distributed data centers or nodes. These conditions may occur when two client requests for modifying a same record stored in a database are simultaneously and independently processed at different distributed nodes for the database. The following illustrative non-limiting example demonstrates how such a condition may manifest.

Consider a database system with multiple distributed nodes that each independently handle client requests specifying modifications to records stored by the database. The database is replicated across the multiple distributed nodes. A given node may handle certain requests based on region-routing, based on load balancing among the nodes, based on being designated for certain clients, or the like. A user, Richard, desires to make two simultaneous modifications to a record in a database (e.g., a record associated with an account, a record specifying inventory quantity, etc.) and accordingly transmits two requests specifying the record. Specifically, Richard's two simultaneous modifications each specify a subtraction of 10 from the record's current value or state, which is 100. Richard's desired outcome for the record is thus demonstrated in Table 1 below.

TABLE 1

| Record Identifier | Seq Number | Record State | Data Value |
|---|---|---|---|
| R0 | 1 | Previous state - 1 | 100 |
| R0 | 2 | Previous state | 90 |
| R0 | 3 | Current state | 80 |

Richard's two requests are routed to two different data centers or nodes of the database. For example, Richard uses two different devices to make the two requests, with one of the devices using a virtual private network (VPN) that represents a different location for Richard; because Richard's devices therefore have different network locations, the requests from Richard's devices are routed to different data centers or nodes. The nodes receive these requests almost at the same time (with a few milliseconds difference) and each read the current state of the record (e.g., a data value of 100) and a current sequence number from the database, which indicates a number of previous modifications or previous states for the record. Each node then processes a request by determining a modified state for the record (e.g., a data value of 90) and an incremented sequence number. Both nodes then save the respectively determined modified state and the incremented sequence number to the database. Table 2 below indicates the outcome at one node, and Table 3 indicates the outcome at the other node.

TABLE 2

| Record Identifier | Seq Number | Record State | Data Value |
|---|---|---|---|
| R0 | 1 | Previous state | 100 |
| R0 | 2 | Current state | 90 |

TABLE 3

| Record Identifier | Seq Number | Record State | Data Value |
|---|---|---|---|
| R0 | 1 | Previous state | 100 |
| R0 | 2 | Current state | 90 |

As demonstrated, the two simultaneous requests by Richard have an overlapping or overshadowing effect rather than a true cumulative effect on the record. Both nodes effectively agree on a modified state and incremented sequence number for the record in the database, and the two requests are processed quickly due to the divided labor; however, the modified state and incremented sequence number determined by each node is incorrect or inconsistent with Richard's desire to make two modifications to the record. It may be appreciated from this example that the conflict arises from each distributed node of the database independently handling requests and from a lack of a primary or central relational database handled by a single data center or node. Accordingly, this conflict or similar conflicts may arise frequently in various scenarios involving distributed databases, such as distributed write-on-any-node databases (e.g., Apache Cassandra) and other database configurations in which such conflicts arise.

This conflict raises a significant issue at least with respect to data accuracy, which has significant effects in downstream data use or consumption. In an example of an account ledger implemented via a distributed database, a user's account balance may be misrepresented and inaccurate when the user makes two simultaneous payments or deposits (at least one of the payments/deposits may become "lost" if independently handled by different data centers or nodes). In another example, inventory management operations may be triggered based on incorrect information, if inventory changes are processed at independent nodes.

Thus, example embodiments provide solutions to these technical challenges. In some embodiments, with respect to requests received during a given time period from multiple nodes (e.g., that each locally replicates the same database), a system may detect conflicting requests or other issues based on sequence information associated with the requests (e.g., sequence indicator or other sequence information locally assigned to the requests by respective nodes from which the requests are received). Such requests may be received during (i) a synchronization-related time period (e.g., a time interval between a prior synchronization time and a next synchronization time, a time period during which synchronization of the nodes is not occurring with respect to replication of the same database or the same record in the database, etc.), (ii) a time period from a time at which a first request was received (e.g., a predetermined length of time after which the first request was received), or (iii) another time period.

In some embodiments, with respect to a database that is locally replicated at a first node and at a second node (e.g., at least partially replicated at such nodes), the system may receive a first set of requests specifying writes to the database from the first node and a second set of requests specifying writes to the database from the second node. The system may detect a conflict between requests that specify a same record and a same sequence indicator (e.g., a sequence number locally assigned by the respective nodes to the requests). As an example, despite that the same state of the record would result from applying either the first or second request to the record (e.g., see Tables 2 and 3 above), the system may flag the requests as potential conflicting requests.

In some embodiments, the system may include a detection system that receives streams that indicate requests (e.g., record modification requests) independently processed at different nodes. In some embodiments, for a first request (e.g., a first record modification request) indicated in a first stream, the detection system monitors the remaining streams for a predetermined length of time. In some examples, the predetermined length of time relates to a period or frequency at which the database is replicated across the different nodes, a time at which an upcoming replication will occur, a clock frequency of the nodes, and/or the like. If a second request (e.g., second record modification request) in another stream specifies the same record in the database and is assigned with the same sequence number as the first request, the detection system may detect a cross-node conflict.

Following the detection, the detection system may perform various operations to resolve, or facilitate the resolution of, the conflict between the first request and the second request. In some embodiments, the detection system provides a notification to users, such as database administrators, who are authorized to manually manipulate the states, values, etc., of database records. In some embodiments, the detection system locks the database record from further modifications or operations after the conflict. The detection system may revert already-processed record modification requests or commanding the nodes to block subsequent record modification requests. In some embodiments, the detection system determines a corrected state of the database record and corrected sequence numbers for the conflicted requests, for example, based on combining the streams and replaying the requests with a fine time resolution or time step. In some embodiments, the detection system implements a model that is used to determine whether the conflict should be automatically resolved, based on a predicted likelihood that the conflict was intentional, malicious, fraudulent, or the like.

FIG. 1 shows an example of a system 100 for detecting or resolving cross-node conflicts in distributed databases, in accordance with one or more embodiments. According to example embodiments, the system 100 is configured for high availability for its users or clients, while also mitigating negative effects of potential concurrency race conditions that could occur from certain database deployments or configurations.

As shown in FIG. 1, the system 100 may include detection system 102, user or client devices 104 (e.g., 104A-104N), a database 106 or datastore, or other components. The detection system 102 implements example techniques disclosed herein to detect concurrency race conditions that may result from client requests to the database 106 from client devices 104. The client requests originating from client devices 104 may include access or read requests, write requests, or the like, and in particular, the concurrency conditions or errors detected by the detection system 102 may arise from write requests, as explained above.

The client devices 104A-104N include systems or devices from which users may transmit the client requests for interfacing with the database 106. These systems or devices may include personal user devices such as desktop computers, notebook or laptop computers, smartphones, tablets, or the like. Accordingly, the client devices 104A-104N may implement client user applications that provide user interfaces via which the users may interface with the data stored by the database 106. In an illustrative non-limiting example in which financial account balances are stored and managed via the database 106, a client device 104 may store a client user application via which a user may view an account balance (via a read request to the database 106), make payments to the account balance (via a write request to the database 106), close an account (via a delete request to the database 106), or the like. In another illustrative non-limiting example, a client device 104 may store an inventory management application via which a user may view a number of inventory items in stock (via a read request to the database 106), store data related to a number of item purchases (via a write request to the database 106), or the like. In some embodiments, a client device 104 is configured to authenticate a user that interfaces with the database 106, for example, based on evaluating login information, collecting biometric information, or the like. The client devices 104A-104N may include other systems or devices that operate within the system 100, such as user devices operated by database administrators, system administrators, and users authorized to manually manipulate the data stored in the database 106.

As illustrated, the system 100 includes a database 106 at which data is collected, stored, managed, or the like. For example, the database 106 may be used to manage financial account information, inventory information, or other information depending on the application or use case. According to example embodiments, the database 106 is a distributed database; the database 106 is implemented by a plurality of distributed database nodes 108 (e.g., 108A-108N). With multiple distributed database nodes 108 implementing the database 106 and serving as interface points for database clients, the database 106 is configured with high availability to provide continuous service to a large population of clients in an efficient manner The plurality of distributed database nodes 108 may be communicatively coupled with one another in order to implement and maintain the database 106 (e.g., via the communications network 150, via an isolated or private network). The plurality of distributed database nodes 108 interact and communicate with one another to maintain atomicity, consistency, isolation, and durability (ACID) properties of the database 106. For example, the distributed database nodes 108 perform operations to periodically synchronize or replicate the database 106 locally.

Each of the plurality of distributed database nodes 108 is implemented by one or more computing systems or devices. For example, a distributed database node 108 may be a data center or server farm with multiple servers, and a distributed database node 108 may be a single computer. In some embodiments, the distributed database nodes 108 are located across different locations or regions. For example, the distributed database nodes 108 are located in different regions to provide low-latency service to database clients in corresponding regions.

Components of the system 100 may communicate with one or more other components of system 100 via a communications network 150 (e.g., Internet, a mobile phone or telecommunications network, a mobile voice or data network, a cable network, a public switched telephone network, or other types of communications networks or combinations of communications networks). The communications network 150 may be a wireless or wired network.

As discussed above, the detection system 102 is configured to implement the technical solutions disclosed herein and perform example techniques disclosed herein. In some embodiments, in implementing the example disclosed techniques, the detection system 102 interacts with the distributed database nodes 108 to receive streams of logs that indicate client requests (e.g., record modification requests generated and transmitted by database clients) processed by each node. In some embodiments, the detection system 102 interacts with client devices 104 to transmit alerts or other notifications of cross-node write conflicts to certain users. In some embodiments, the detection system 102 is configured to perform techniques disclosed herein based on the detection system 102 being implemented by one or more processors and one or more memories storing instructions for implementing the techniques disclosed herein. In some examples, the detection system 102 is implemented in a distributed manner, in which various operations or portions of the example techniques are performed at different computing units. In some embodiments, the detection system 102 is instantiable or scalable. For example, the system 100 is configured to instantiate additional instances of the detection system 102 based on increased activity on the database 106 or to scale additional computing resources (e.g., in a cloud computing system or platform) for the detection system 102.

In some embodiments, the detection system 102 includes a listener subsystem 112, a conflict or collision resolution subsystem 114, an attack detection subsystem 116, or other components, and the components or subsystems of the detection system 102 implement various functionality and operations described herein. In some embodiments, each of the subsystems 112-116 may be embodied as dedicated or special-purpose hardware (e.g., one or more application-specific integrated circuits (ASICs), programmable logic devices (PLDs), field-programmable gate arrays (FPGAs), or the like), programmable circuitry (e.g., one or more microprocessors, microcontrollers, or the like) programmed with or configured to execute executable instructions stored on non-transitory memory devices, or as any combination of the same.

In some embodiments, the listener subsystem 112 is configured to allow the distributed database nodes 108 to publish or stream data to a messaging subsystem or system (e.g., an Apache Kafka event streaming topic), receive the data at the messaging subsystem, monitor the data for an indication of a cross-node write conflict at the database 106, or detect cross-node write conflicts based on the monitoring. According to example embodiments, the data includes logs of database client requests independently processed by the distributed database nodes 108. In some embodiments, the listener subsystem 112 is further configured to sort the data published or streamed to the messaging subsystem. For example, the listener subsystem 112 may sort the logs to enable a replaying of conflicted sets of database client requests for an automatic resolution of a cross-node write conflict.

The collision resolution subsystem 114 is configured to resolve, or facilitate resolution of, a cross-node write conflict. For example, the collision resolution subsystem 114 is configured to resolve or facilitate resolution of a cross-node write conflict detected by the listener subsystem 112. In some embodiments, the collision resolution subsystem 114 is configured to resolve or facilitate resolution of a cross-node write conflict based on locking a record in the database 106 that is subject to the cross-node write conflict, transmitting an alert of the conflict to certain users authorized to manipulate the record (and metadata associated therewithin, such as sequence numbers and modification timestamps), receiving correction information for the record, or unlocking the record. In some embodiments, the collision resolution subsystem 114 is configured to resolve or facilitate resolution of a cross-node write conflict based on locking the record subject to the cross-node write conflict, replaying a set of requests that caused the cross-node write conflict, determining correction information for the conflict, or saving the correction information to the database 106. In some embodiments, the collision resolution subsystem 114 is configured to replay the set of requests based on receiving a sorted sequence of requests from the listener subsystem 112. In some embodiments, the collision resolution subsystem 114 is configured to determine whether to resolve or facilitate resolution of a cross-node write conflict based on a likelihood that the conflict was an intentional or malicious attack on the database 106. For example, the collision resolution subsystem 114 is configured to invoke the attack detection subsystem 116 of the detection system 102 to determine whether to resolve or facilitate resolution of the cross-node write conflict.

In some embodiments, the attack detection subsystem 116 is configured to determine or predict whether a cross-node write conflict was likely intentional, malicious, or part of a cyberattack on the database 106. In some examples, the attack detection subsystem 116 is configured to evaluate a cross-node write conflict detected by the listener subsystem 112 and provide an output (e.g., a likelihood of attack) to the collision resolution subsystem 114. In some embodiments, the attack detection subsystem 116 is configured to determine or predict whether a cross-node write conflict was likely intentional or malicious based on retrieving user information (e.g., user profile data) associated with one or more users from which the requests causing the conflict originated, provide the user information to an attack-detection model that is configured or trained to output a likelihood that the conflict was intentional or malicious based on the user information and other information (e.g., intrinsic aspects of the request, such as a modification magnitude or amount), or classify the conflict as malicious or not based on an output from the model. In some embodiments, the attack detection subsystem 116 is configured to train the attack-detection model using datasets describing historical cross-node write conflicts.

It should be noted that, while one or more operations may be described herein as being performed by particular components of detection system 102, those operations may, in some embodiments, be performed by other components of detection system 102 or other components of system 100. As an example, while one or more operations are described herein as being performed by components of detection system 102, those operations may, in some embodiments, be performed by components of a client device 104. It should be noted that, although some embodiments are described herein with respect to machine learning models, other intelligence or prediction models (e.g., statistical models or other analytics models) may be used in lieu of or in addition to machine learning models in other embodiments (e.g., a statistical model replacing a machine learning model and a non-statistical model replacing a non-machine-learning model, in one or more embodiments).

Figure 2:
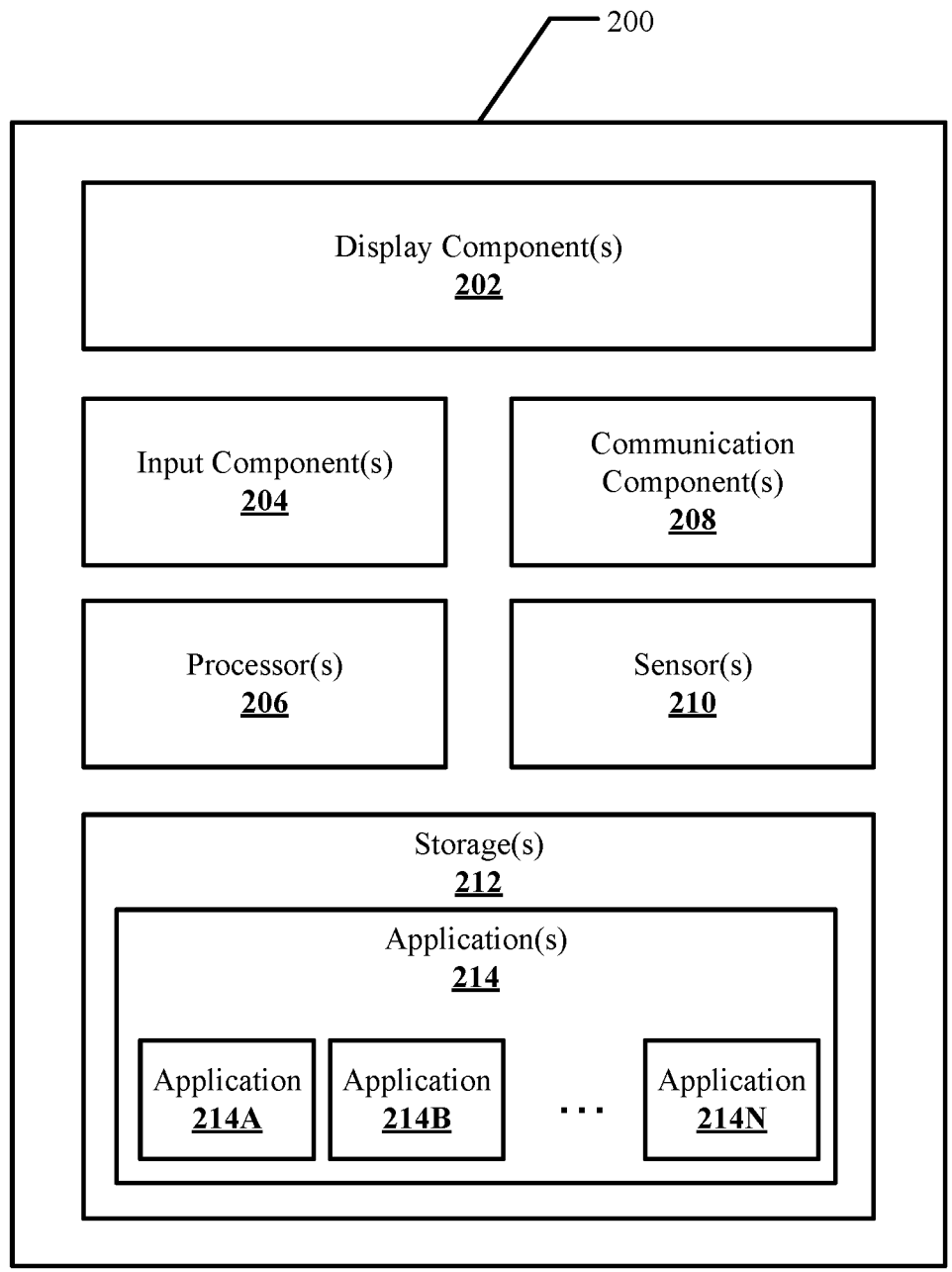
FIG. 2 shows an example computing system for performing operations to detect or resolve cross-node conflicts in distributed databases, in accordance with one or more embodiments.

In some embodiments, with respect to FIG. 2, one or more operations described herein may be performed by a computing system 200. In some embodiments, the computing system 200 may embody the detection system 102 or components thereof (e.g., subsystems 112-116). As illustrated, the computing system 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications 214. For example, applications 214A-214N may represent different applications stored on computing system 200, and an application 214 may correspond to the performance of various example operations herein. An example application 214 may be configured to monitor streams from database nodes for requests that conflict with other requests. Another example application 214 may be configured to train and use an attack-prediction model to determine whether to automatically resolve a cross-node conflict. In various embodiments, communication components 208 may be configured for receiving streams of locally and independently processed client requests and transmitting notifications or alerts to users, for example.

Figure 3:
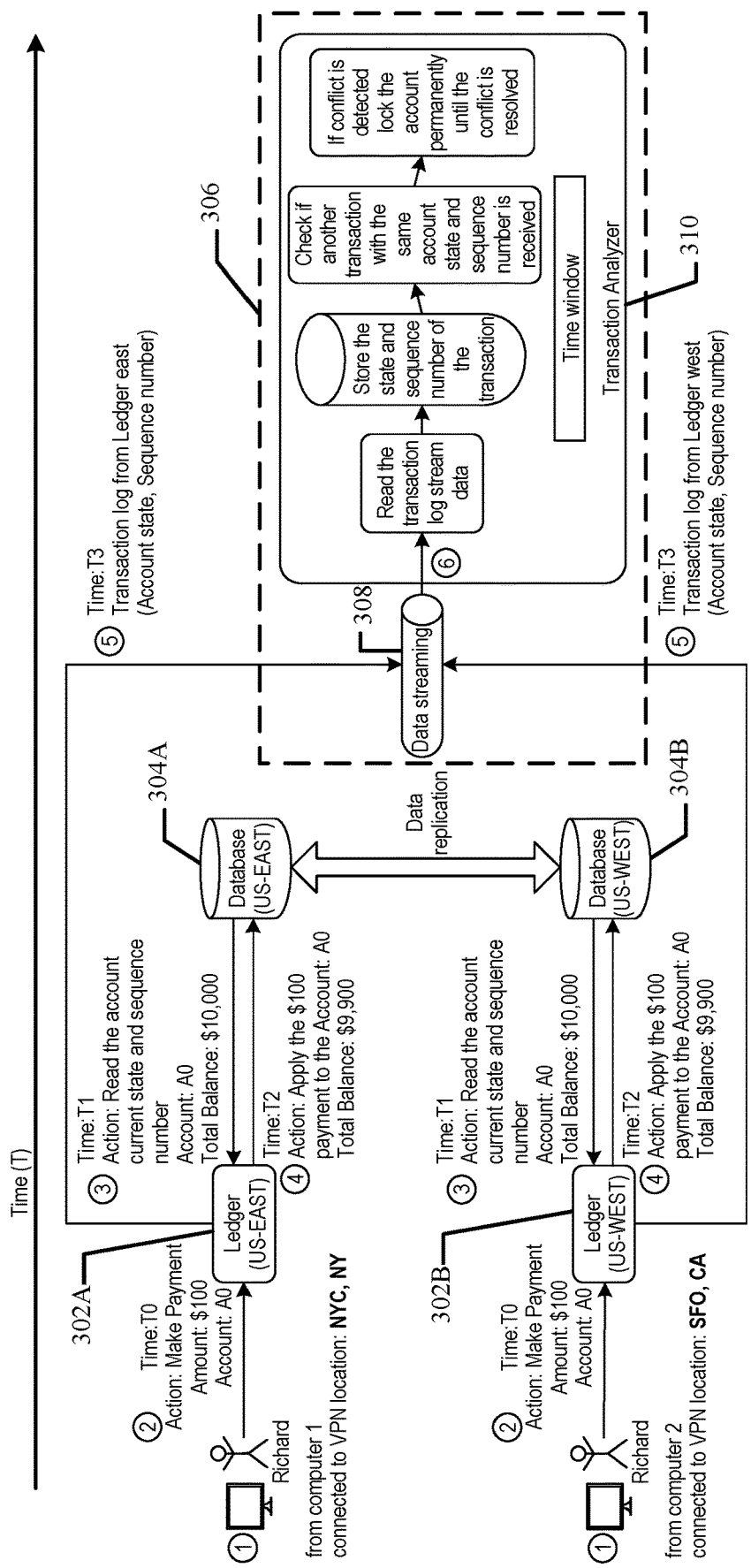
FIG. 3 shows another example system for detecting and resolving cross-node conflicts in a distributed database, in accordance with one or more embodiments.

FIG. 3 illustrates a system 300 for detecting and resolving cross-node conflicts occurring in a distributed database. In one use case, the system 300 relates to a distributed database for managing account information, such as payable account balances, transactions, etc. As an example, records stored in the distributed database may specify account balance information, such as Richard's account balance of $100. That being said, it will be appreciated that the technical solutions demonstrated in FIG. 3 are not limited to the illustrated use case. For example, rather than records stored in the distributed database relating to account balance information, the records stored in any example distributed database to which the disclosed solutions are applicable may store other quantifiable information, such as inventory items, academic course grades, personnel information, telephone numbers or contact information, or the like. Irrespective of the specific use case of the distributed database, the solutions improve the ability of the distributed database to maintain the accuracy of the data stored therewithin.

The illustrated example demonstrates how a cross-node write conflict may manifest. At a time T0, two concurrent client requests are transmitted to a distributed database. As illustrated, a user ("Richard") makes two client requests ("Make Payment" with "Amount: $100") via two user devices ("computer 1" and "computer 2") related to a record stored within a distributed database ("Account: A0"). The two client requests are each routed to different nodes of the distributed database, specifically a first node 302A ("US- EAST") and a second node 302B ("US-WEST"). As continued to be explained below, the cross-node write conflict arises from these concurrent requests being routed and independently processed by different nodes. In the illustrated example, the concurrent requests are routed to the different nodes, which are region-associated, based on Richard using a VPN on at least one of his devices.

In other examples, the two client requests may not originate from the same user. In the illustrated example, multiple users may be authorized to make payments to an account (or generally, make requests to modify a record associated with the account), and the two (or more) concurrent client requests originate from at least two different users. Alternatively, instead of Richard making requests concurrently via two different devices ("computer 1" and "computer 2"), the concurrent requests may be transmitted via one device and routed to different nodes due for load balancing purposes or the like. These and other scenarios will be understood by one of skill in the art as potentially causing a cross-node write conflict.

Through times T1 and T2, each of the first node 302A and the second node 302B processes the request routed thereto. In some embodiments, the nodes are configured to authenticate the user to determine whether the user (e.g., Richard) is authorized to modify or make requests for the account. Then, in order to process one of Richard's requests, each of the first node 302A and the second node 302B reads the current state of Richard's account (or record representing the account) and the sequence number of Richard's account. Each node reads the current information from a database copy 304 or instance of the distributed database locally stored or independently accessible by the node. For example, as shown in the illustrated example, a first database copy 304A is associated with the first node 302A, and a second database copy 304B is associated with the second node 302B. Generally, to maintain at least consistency properties, database copies 304 for multiple nodes are synchronized, replicated, or kept consistent periodically. Data replication may occur at a frequency or may be triggered by one or more database operations. Here, due to data replication, both the first node 302A and the second node 302B may determine that the current state or data value associated with Richard's account is $10,000 and may determine a consistent sequence number of Richard's account.

The sequence number for a record is generally used to specify a history or sequence order of the record. The sequence number may be incremented for each database operation for the record, and each database operation may be assigned with or represented by a corresponding sequence number. With sequence numbers being recorded for each database operation on a record, the record may be reverted to previous states in the event of a database failure, for example.

Because the first node 302A and the second node 302B read the same current information for Richard's account and because both client requests specify a same modification to Richard's account, the first node 302A and the second node 302B both determine the same modified state for Richard's account (a new total balance of $9,900). Significantly, because the first node 302A and the second node 302B independently process the two client requests at approximately the same time, the first node 302A and the second node 302B both determine the same incremented sequence number and both respectively assign this same incremented sequence number to the client requests. By having the same incremented sequence number, the client requests are thus in conflict.

When the first node 302A and the second node 302B determine the modified state and incremented sequence number for Richard's account, the first node 302A and the second node 302B save this updated information to their respective copies or instances of the distributed database (first database copy 304A and second database copy 304B). In some examples, the cross-node write conflict may not be detected during data replications occurring thereafter, due to the respective database copies or instances essentially recording the same information already.

It will be further recognized that the concurrency of the cross-node write conflict may be tied to the replication behavior of the distributed database. In particular, the first node 302A and the second node 302B may not independently process the requests at the exact same time (e.g., time T1 and time T2), but for the conflict to arise, the first node 302A and the second node 302B at least both process their respective requests before data replication may occur. That is, for example, the second node 302B saves updated information to the second database copy 304B before the updated information saved by the first node 302A to the first database copy 304A may be replicated to the second database copy 304B, and vice versa, for the conflict to arise.

As illustrated, the system 300 includes a detection system 306 configured to detect the cross-node write conflict and enable resolution thereof. The detection system 306 is configured to receive logs from each of the first node 302A and the second node 302B that indicate the requests processed respectively thereby. In some embodiments, the detection system 306 comprises a data streaming component 308 at which the logs from the database nodes are received. For example, the data streaming component 308 is a messaging system, a message queue, a message broker, an event queue, a data buffer, or the like to which the nodes may publish event or log data. In an example, the data streaming component 308 is an Apache Kafka Topic. The data streaming component 308 is thus configured to collect or receive log data from the database nodes, and, in some embodiments, the data streaming component 308 is further configured to provide the log data to subscribers of the data streaming component 308, for example, by allowing subscribers to consume the log data, by notifying the subscribers of data available for consumption, by transmitting the data to the subscribers, or the like.

In some embodiments, the detection system 306 comprises an analysis component 310 communicatively coupled to the data streaming component 308. In particular, the analysis component 310 consumes the data streamed to and collected at the data streaming component 308. In some embodiments, the analysis component 310 performs example techniques disclosed herein to analyze the data to detect whether a cross-node write conflict has occurred.

According to the illustrated example, the analysis component 310 reads or consumes the log data and stores a state and sequence number associated with a given record modification request (e.g., a transaction) for a time window. For example, the analysis component 310 stores, for the request processed by the first node 302A, the state ($9,900) and the sequence number assigned to the request. Then, the analysis component 310 continues to monitor the data streamed to and collected at the data streaming component 308 for another request processed by any other node that is assigned with the same sequence number. In some examples, the other request that is monitored also has the same state. Therefore, in the illustrated example, the analysis component 310 is able to detect the request processed by the second node 302B, which has the same sequence number and state ($9,900).

In some embodiments, the time window for which the analysis component 310 monitors the streamed data relates to the aspects of concurrency discussed above or to aspects of data replication of the distributed database. For example, the time window is less than a period or frequency at which data replication for the distributed database is performed.

Following the detection of the cross-node write conflict, the detection system 306 may perform various post-detection operations, including those described herein. In the illustrated example, the detection system 306 locks Richard's account from further requests/transactions/modifications. In order to lock Richard's account, the detection system 306 may transmit a command to the nodes of the distributed database (including the first node 302A and the second node 302B) that causes the nodes to decline to process further requests that specify Richard's account.

Figure 4:
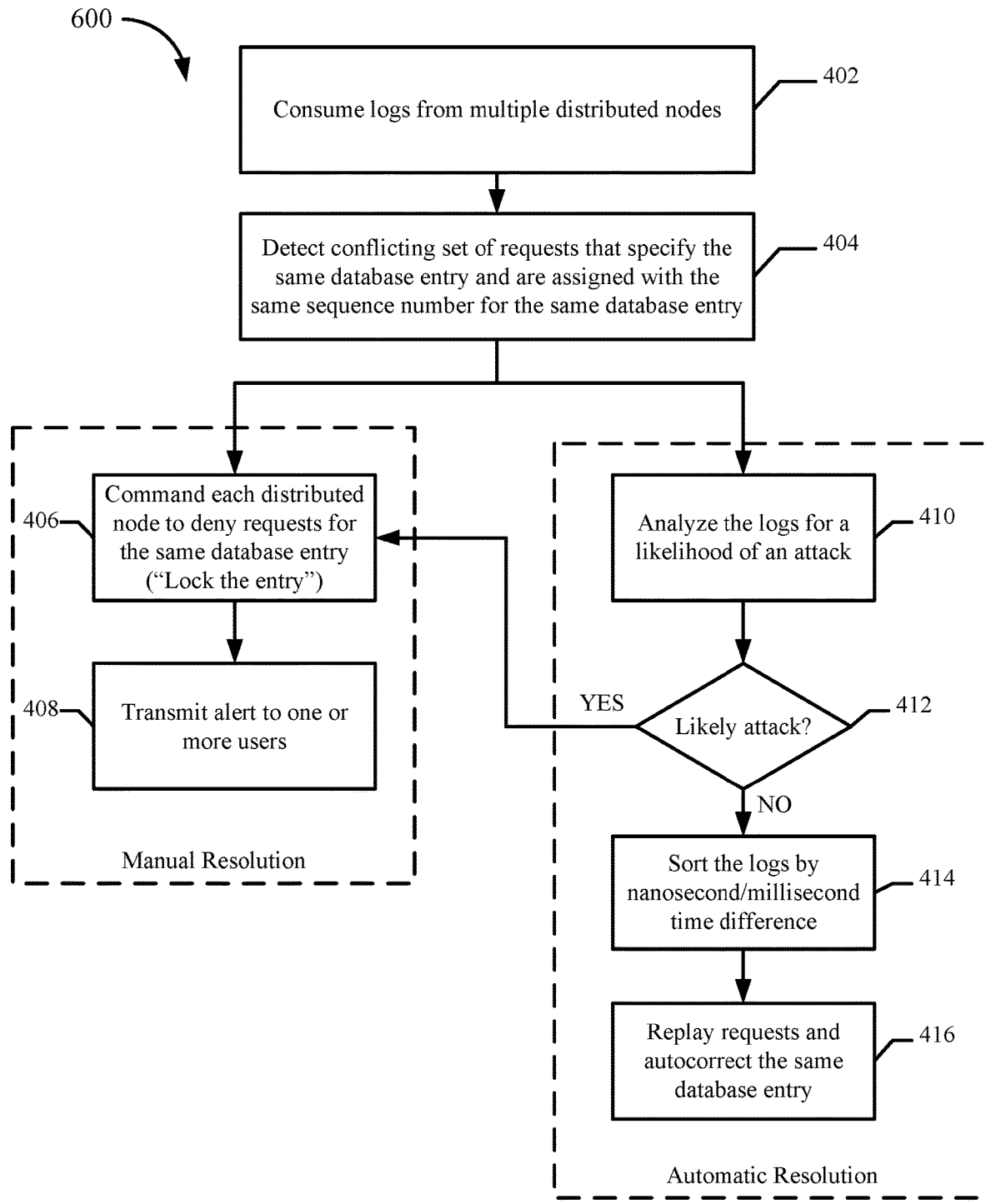
FIG. 4 shows a flowchart of example operations for detecting and resolving cross-node conflicts in distributed databases, in accordance with one or more embodiments.

FIG. 4 is an example flowchart of a method 400 for implementing the technical solutions described in detail above. As illustrated, the method 400 includes processing operations presented below that are intended to be illustrative and non-limiting. In some embodiments, for example, the method may be accomplished with one or more additional operations not described or without one or more of the operations discussed. Additionally, the order in which the processing operations of the method are illustrated (and described below) is not intended to be limiting.

In some embodiments, the method 400 may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. In some embodiments, portions or operations illustrated in the flowchart of FIG. 4 are implemented and performed by one or more of the subsystems 112-116 shown in and described with respect to FIG. 1.

In an operation 402, the system consumes logs from multiple nodes for a distributed database. In an operation 404, the system detects a conflicting set of record modification requests in the logs. The set of requests are detected in logs from different nodes, specify the same record in the distributed database, and are assigned with the same sequence number for the same record. In some examples, the set of requests each indicate the same modified state (e.g., a data value) of the same record. The conflicting set of requests also occur within a predetermined time period or window or each other, this time period or window representing a concurrency or simultaneity of the requests.

According to some embodiments, the system enables manual resolution of the detected conflict, for example, via operations 406 and 408. In an operation 406, the system first commands each distributed node to deny subsequent requests for the same record. As such, the same record is effectively locked. The same record is locked to allow a user to investigate and manually resolve the conflict. In an operation 408, the system transmits an alert or other notification to one or more users, the alert or other notification indicating the cross-node write conflict. In some examples, the alert or other notification is transmitted to one or more of the client devices 104 in the system 100 that are operated by the one or more users. In some embodiments, the one or more users are users authorized to make manual changes to records stored in the database. For example, the one or more users include database administrators, system administrators, or the like. In some examples, the one or more users include the user from which the conflicting set of requests originate. For example, the system indicates to a person making concurrent payments to an account represented by the same database record that a conflict has occurred. In some examples, the same record subject to the conflict is associated with a plurality of authorized users, and the system transmits the alert or other notification to each of the authorized users.

In some embodiments, the system locks the record for a specific length of time and indicates this specific length of time in the alert or other notification to suggest that the one or more users resolve the cross-node write length before the record is unlocked. In some embodiments, this specific length of time may be related to high availability requirements for the database, such as a minimum frequency of requests that the database must be able to handle. In some embodiments, the specific length of time may be based on a prediction of when a subsequent request for the same record may occur.

Subsequent to transmitting the alert, the system may receive correction information from the one or more users. In some examples, the correction information includes at least corrected sequence numbers for the conflicting set of requests and a corrected state of the same sequence number. Returning to the illustrative example toward the beginning of this document, the one or more users may manually resolve Richard's concurrent requests (each independently assigned with a sequence number of 2 and indicating a new value of 90) by assigning one of the requests with a sequence number of 2 and the other with a sequence number of 3, and also specifying that the record should have a corrected value of 80. Correction information provided by users may be collected or aggregated by the system to create training datasets, such that the system may train and implement a model to automatically resolve cross-node write conflicts.

As illustrated in FIG. 4, the method 400 may further include processing operations for automatically resolving the cross-node write conflict represented by the conflicting set of requests detected in the operation 404. With respect to the automatic resolution, the system may again lock the record subject to the conflict in some embodiments (the system also performs operation 406 for the automatic resolution). In an operation 410, the system analyzes the logs for a likelihood of an attack or a likelihood that the occurring conflict was intentionally or maliciously triggered. In some embodiments, the system uses an attack-prediction model to predict this likelihood, as explained in more detail in this document. For example, the attack-prediction model is or includes a machine learning model that is trained to predict the likelihood of attack based on historical data related to other (and potentially similar) cross-node write conflicts. In some embodiments, the analyzing by the system may be based on intrinsic characteristics or aspects of the conflict, such as a time difference between the conflicting set of requests, locations from which the conflicting set of requests originate, magnitudes of the modifications indicated by the conflicting set of requests, or the like. Alternatively, or additionally, the analyzing by the system may be based on extrinsic aspects of the conflict, such as a user or customer profile for the user(s) submitting the conflicting set of requests (including a request history, request frequency, or the like), a network latency associated with each distributed node, or the like.

In a decision point 412, the system evaluates the likelihood of attack. If the likelihood satisfies a threshold, for example, the system may switch over to a manual resolution of the cross-node write conflict in which users are recruited for an investigation of the conflict. If the likelihood does not satisfy the threshold or does not suggest that the conflict was intentional or malicious, then the system may continue with automatic resolution of the conflict.

In an operation 414, the system sorts the logs by a fine time difference, which may be on the scale of milliseconds, nanoseconds, or the like. In some embodiments, the system creates a combined or aggregate log with every request being sorted according to the fine time difference. The system may sort the logs based on each request in the logs being associated with a timestamp. In some embodiments, the distributed nodes are located in different regions and time zones, and the system converts the timestamps (generated by each node according to a local time of each node) to a standard time. In some examples, the fine time difference is less than the predetermined time period or window in which the conflicting set of requests occur, such that the conflicting set of requests may be sorted.

In an operation 416, the system replays the requests based on the log sorting and autocorrects the conflicting set of requests and the record. Due to the sorting, the system is able to replay at least the conflicting set of requests in a non-simultaneous sequence such that a sequence order of the conflicting set of requests may be determined. From this sequence order, the system determines corrected sequence numbers for each of the conflicting requests. Also from this sequence order, the system determines a corrected state or value for the record.

In some embodiments, subsequent to either one of the manual resolution or the automatic resolution, the system may unlock the database records by commanding each distributed node to permit requests for the record again.

Figure 5:
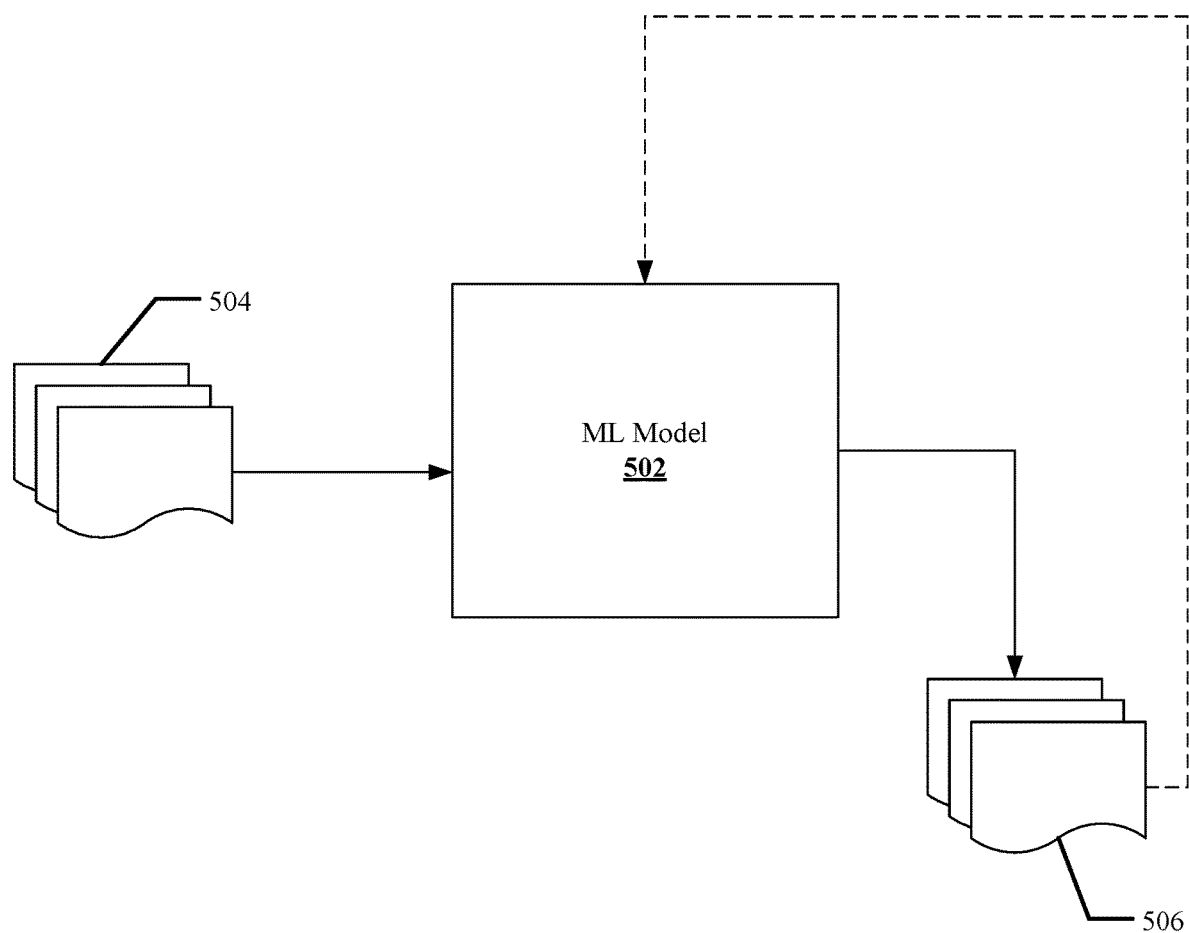
FIG. 5 shows an example machine learning model used with resolving cross-node conflicts in distributed databases, in accordance with one or more embodiments.

FIG. 5 shows an example of a machine learning model 502 that may be trained to predict whether or not a cross-node conflict or write collision as discussed herein occurred as an intentional attack or exploitation of a database system. In some embodiments, the machine learning or prediction models described herein, such as machine learning model 502, may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it propagates to other neural units. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, data defining neural units and parameters thereof (e.g., weights, biases, hyperparameters) as well as data defining an architecture of a machine learning model (e.g., specific connections or edges between specific neural units, configuration of different layers) may be stored in one or more model databases. Training of a model that is defined in a model database may comprise modifying one or more parameters stored within the model database. In some embodiments, the database itself (e.g., the database that is the subject of a cross-node conflict and the solutions disclosed herein) includes a partition, an instance, or the like that stores the model. In doing so, the model is "internally" stored and managed, thus improving the privacy and security of the data in the database that is in conflict. For example, client requests and database records do not need to be shared outside of a database system (e.g., the system 100 shown in and described with respect to FIG. 1) for evaluation.

As illustrated, the machine learning model 502 may take inputs 504 and provide outputs 506. According to example embodiments, the machine learning model 502 is trained based on updates to its configurations (e.g., weights, biases, or other parameters) based on an assessment of the outputs 506 with labels assigned to the inputs 504 according to a training dataset. The labels serve as reference feedback information or expected outputs corresponding to the inputs 504. In some embodiments, where machine learning model 502 is a neural network, connection weights may be adjusted to reconcile differences between the outputs 506 and the labels assigned to the inputs 504 according to a training dataset. In some embodiments, one or more neurons (or nodes) of the neural network may require that their respective errors (e.g., a difference between a network output and a label in a training dataset) be sent backward through the neural network to them to facilitate the update process (e.g., backpropagation of error). Updates to the connection weights may, for example, be reflective of the magnitude of error propagated backward after a forward pass has been completed. In this way, for example, the machine learning model 502 may be trained to generate predictions that reflect the expected outputs indicated in the training dataset.

In some embodiments, where the prediction models include a neural network, the neural network may include one or more input layers, hidden layers, and output layers. The input and output layers may respectively include one or more nodes, and the hidden layers may each include a plurality of nodes. The neural network may also include different input layers to receive various input data. Also, in differing examples, data may be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization.

In a recurrent structure, a node of a layer may be again input to the same node or layer at a subsequent time, while in a bidirectional structure forward and backward connections may be provided. The links are also referred to as connections or connection weights, as referring to the hardware-implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the example recognition objectives above. According to example embodiments, the connections and connection weights are modified based on labels that are included in training datasets that are improved or enhanced using context data.

As discussed, the machine learning model 502 may be trained and configured to predict whether or not a cross-node write conflict is intentional, malicious, or part of a cyberattack or exploitation of the distributed database. In order to generate the prediction, the machine learning model 502 may be configured to receive, in the inputs 504, intrinsic aspects of the cross-node write conflict, including which nodes processed the conflicting requests, whether the conflicting requests originated from the same authorized user, a magnitude of the modification specified by each conflicting request, a time difference between the conflicting requests, or the like. These intrinsic aspects may be specified in a training dataset in which historical cross-node write conflicts are labeled as either malicious or not, and the machine learning model 502 may generate an output 506 based on at least these intrinsic aspects of a given cross-node write conflict, the output 506 being a binary classification, a probability or likelihood, or the like.

Alternatively, or additionally, the machine learning model 502 may be configured to receive, in the inputs 504, extrinsic aspects of the cross-node write conflict, and in particular, aspects relating specifically to the user(s) submitting the conflicting requests. For example, historical behavior of a user, as specified in a user profile, may be provided as input to the machine learning model 502, which may be trained to infer whether the conflicting requests are significantly abnormal compared to the historical behavior (e.g., the user frequently uses multiple devices and a VPN to submit client requests). Other extrinsic or user-specific aspects that may be provided as inputs 504 to the machine learning model 502 may include known or permitted devices operated by the user, a credit score of the user, or the like. In some embodiments, a network latency associated with each node is one of the inputs 504 to the machine learning model 502. For example, concurrent processing of requests by different nodes results from different network latencies, and the cross-node write conflict is unintentional.

In some embodiments, the various computers and subsystems illustrated in FIG. 1 may include one or more computing devices (e.g., computing system 200 shown in FIG. 2) that are programmed to perform the functions described herein. The computing devices may include one or more electronic storages (e.g., storage(s) 212 as illustrated in FIG. 2), one or more physical processors programmed with one or more computer program instructions (e.g., processor(s) 206 as illustrated in FIG. 2), and/or other components. The computing devices may include communication lines or ports to enable the exchange of information within a network or other computing platforms via wired or wireless techniques (e.g., Ethernet, fiber optics, coaxial cable, Wi-Fi, Bluetooth, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; and/or other mechanisms for configuring processing capabilities on the processors.

Although various embodiments of the present disclosure have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment may be combined with one or more features of any other embodiment.

The present techniques may be better understood with reference to the following enumerated embodiments:

1. A method comprising: receiving a first set of requests that are processed at a first node and specify writes to a database that is locally replicated at the first node and at a second node, wherein each request of the first set of requests is assigned a sequence number by the first node based on previous writes for a corresponding record locally replicated at the first node and at the second node; receiving a second set of requests that are processed at the second node and specify writes to the database to which the first set of requests specify writes, wherein each request of the second set of requests is assigned a sequence number by the second node based on the previous writes; detecting, within a preconfigured time period of receiving a first request within the first set, a second request within the second set that (i) specifies a same record as the first request and (ii) is assigned, by the second node, a same sequence number as the first request; preventing, based on the detection, the first node and the second node from processing subsequent requests for modifying the same record specified by the first request and the second request; and subsequent to corrected sequence numbers for the first request and the second request being determined, replicating the first request and the second request with the corrected sequence numbers at both the first node and the second node.

2. A method comprising: receiving streams of record modification requests (e.g., read/write/delete requests, ledger or transaction requests, etc.) processed at a plurality of distributed database nodes (e.g., data centers, servers, etc.) for a database, each record modification request specifying a corresponding record (e.g., a record associated with an account, an inventory item, etc.) in the database and comprising a sequence number assigned by a respective distributed database node, wherein the sequence number indicates preceding modifications for the corresponding record that are locally replicated at the respective distributed database node; detecting a conflicted set of record modification requests in different streams, the conflicted set of requests each (i) specifying a same record in the database, (ii) comprising a same sequence number, and (iii) being respectively received within a preconfigured time period of each other; in response to detecting the conflicted set of record modification requests, causing each of the plurality of distributed database nodes to not process subsequent requests for the same record; and subsequent to corrected sequence numbers for the conflicted set of requests being determined, transmitting the corrected sequence numbers to each of the plurality of distributed database nodes such that the conflicted set of record modification requests is replicated at each node.

3. The method of any of preceding embodiments, wherein the conflicted set of requests originate from a same user that is authorized to request modifications to the same record in the database.

4. The method of any of the preceding embodiments, wherein the preconfigured time period is less than a time in which the database is periodically replicated across each of the plurality of distributed database nodes.

5. The method of any of the preceding embodiments, wherein each request of the conflicted set of record modification requests specifies the same modified state of the same record (e.g., a request specifies a modification (e.g., add 10, subtract 5, multiply by factor of 2), the request specifies a previous state/value and a new state/value), and wherein the method further comprises: determining a corrected state of the same record (e.g., a new state, value, etc. that cumulatively applies record modifications specified by the conflicted set of requests); and transmitting the corrected state to each of the plurality of distributed database nodes.

6. The method of any of the preceding embodiments, wherein the plurality of distributed database nodes are associated with different service regions of the database, and wherein at least one of the conflicting set of record modification requests is routed to a different node from others of the conflicting set of requests based on being transmitted via a virtual private network (VPN).

7. The method of any of the preceding embodiments, wherein the plurality of distributed database nodes are associated with different time zones, and wherein the method further comprises: determining the corrected sequence numbers for the conflicted set of record modification requests based on combining the streams with respect to a standard time zone.

8. The method of any of the preceding embodiments, further comprising: transmitting an alert or other notification to a user, the notification indicating a time period in which the nodes are caused to not process subsequent record modification requests for the same record; and receiving an input from the user that indicates the corrected sequence numbers for the conflicted set of record modification requests.

9. The method of any of the preceding embodiments, further comprising: using an attack-prediction model to determine whether to resolve the conflicted set of record modification requests.

10. One or more tangible, non-transitory, machine-readable media storing instructions that, when executed by one or more processors, cause the processors to perform operations comprising those of any of the foregoing method embodiments.

11. A system comprising: one or more processors; and memory storing instructions that, when executed by the processors, cause the processors to effectuate operations comprising those of any of the foregoing method embodiments.

What is claimed is:

1. A system for detecting database conflicts across distributed database nodes, the system comprising:
   one or more non-transitory media storing computer program instructions; and
   one or more processors configured to execute the computer program instructions to effectuate operations comprising:
   replicating a database across a plurality of distributed database nodes that are each configured to locally process record modification requests for modifying records in the database;
   receiving (i) a first stream of record modification requests processed at a first node of the plurality of distributed database nodes and (ii) a second stream of record modification requests processed at a second node of the plurality of distributed database nodes, each record modification request in the first stream and the second stream specifying a corresponding record in the database and comprising a sequence number independently assigned by the first node or the second node respectively, wherein the sequence number independently assigned by the first node or the second node (i) indicates preceding modifications for the corresponding record that are locally replicated at the first node or the second node respectively and (ii) is incremented, by the first node or the second node, from a previous value of the sequence number in connection with processing a respective record modification request at the first node or the second node respectively;
   detecting a conflicting set of record modification requests comprising a first request in the first stream and a second request in the second stream based on the first request and the second request both (i) specifying a same record in the database and (ii) being associated with a same sequence number, the conflicting set being respectively received within a preconfigured time period of each other;

in response to detecting the conflicting set of record modification requests for the same record, causing each of the plurality of distributed database nodes to suspend processing of subsequent record modification requests for the same record; and subsequent to corrected sequence numbers for the conflicting set of record modification requests being determined, transmitting the corrected sequence numbers to each of the plurality of distributed database nodes such that the conflicting set of record modification requests is replicated at the first node and the second node, wherein the transmitting causes each of the plurality of distributed database nodes to permit subsequent record modification requests for the same record.

2. The system of claim 1, wherein the first request and the second request both originate from a same user that is authorized, by the first node and the second node respectively, to request modifications to the same record in the database.

3. The system of claim 1, wherein the preconfigured time period is less than a time in which the database is periodically replicated across the first node and the second node.

4. The system of claim 1, wherein each record modification request in the first stream and the second stream specifies a modification to the corresponding record with respect to a preceding state of the corresponding record that is replicated at the first node and the second node, and wherein the operations further comprise:

determining a new state of the same record based on (i) the corrected sequence numbers for the conflicting set of record modification requests and (ii) respective modifications specified by the conflicting set of record modification requests; and transmitting the new state of the same record to each of the first node and the second node.

5. The system of claim 1, wherein the first node and the second node are associated with different service regions of the database, and wherein the first request and the second request are processed by different nodes based on at least one of the first request or the second request originated from a user device using a virtual private network (VPN).

6. A method comprising:

receiving a first set of requests that are processed at a first node and specify writes to a database that is locally replicated at the first node and at a second node, wherein each request of the first set of requests is assigned a first sequence number by the first node based on previous writes for a corresponding record locally replicated at the first node and at the second node, wherein the first sequence number is incremented by the first node from a first previous value of the first sequence number in connection with processing a respective request of the first set of requests;

receiving a second set of requests that are processed at the second node and specify writes to the database to which the first set of requests specify writes, wherein each request of the second set of requests is assigned a second sequence number by the second node based on the previous writes, wherein the second sequence number is incremented by the second node from a second previous value of the second sequence number in connection with processing a respective request of the second set of requests;

detecting, within a preconfigured time period of receiving a first request within the first set of requests, a second request within the second set of requests that (i) specifies a same record as the first request and (ii) is assigned, by the second node, a same sequence number as the first request;

preventing, based on the detection, the first node and the second node from processing subsequent requests for modifying the same record specified by the first request and the second request; and subsequent to corrected sequence numbers for the first request and the second request being determined, replicating the first request and the second request with the corrected sequence numbers at both the first node and the second node.

7. The method of claim 6, further comprising:

determining the corrected sequence numbers for the first request and the second request based on combining the first set of requests and the second set of requests with respect to local timestamps associated with each request in the first set of requests and the second set of requests, wherein the first node and the second node are located in different time zones, and wherein combining the first set of requests and the second set of requests comprises converting the local timestamps associated with each request in the first set of requests and the second set of requests to a standard time zone.

8. The method of claim 6, further comprising:

transmitting a notification indicating the first request and the second request to a user, the notification indicating to the user a time period for which the first node and the second node are prevented from processing the subsequent requests for the same record; and receiving an input from the user that indicates the corrected sequence numbers for the first request and the second request.

9. The method of claim 6, wherein the first request and the second request both originate from a same user that is authorized, by the first node and the second node respectively, to request modifications to the same record in the database.

10. The method of claim 9, wherein the first node and the second node are associated with different service regions of the database, the first request and the second request being routed to be processed at the first node and the second node respectively based on respective locations represented by client devices from which the first request and the second request originate.

11. The method of claim 6, further comprising:

using an attack-prediction model to determine whether to resolve the first request and the second request being assigned with the same sequence number; and replicating the first request and the second request with the corrected sequence numbers at both the first node and the second node in response to determining that the first request and the second request should be resolved.

12. The method of claim 6, further comprising:

determining a new state of the same record based on (i) the corrected sequence numbers for the first request and the second request and (ii) modified states of the same record specified by the first request and the second request; and transmitting the new state of the same record to each of the first node and the second node.

13. The method of claim 6, wherein the preconfigured time period is less than a time period used to replicate the database across the first node and the second node.

14. One or more non-transitory, computer-readable media storing instructions that, when executed by one or more processors, cause operations comprising:

receiving a first set of requests that are processed at a first node and specify writes to a database that is replicated at the first node and at a second node, wherein each request of the first set of requests is assigned a sequence identifier by the first node, that is updated in connection with processing a respective request of the first set of requests by the first node, based on previous writes for a corresponding record replicated at the first node and at the second node;

receiving a second set of requests that are processed at the second node and specify writes to the database to which the first set of requests specify writes, wherein each request of the second set of requests is assigned a sequence identifier by the second node, that is updated in connection with processing a respective request of the second set of requests by the second node, based on the previous writes;

detecting a second request of the second set of requests that (i) specifies a same record as a first request of the first set of requests and (ii) is assigned, by the second node, a same sequence identifier as the first request;

preventing, based on the detection, the first node and the second node from processing subsequent requests for modifying the same record specified by the first request and the second request; and subsequent to corrected sequence identifiers for the first request and the second request being determined, replicating the first request and the second request with the corrected sequence identifiers at both the first node and the second node.

15. The one or more non-transitory, computer-readable media of claim 14, the operations further comprising:
determining the corrected sequence identifiers for the first request and the second request based on combining the first set and the second set with respect to local timestamps associated with each request in the first set of requests and the second set of requests, wherein the first node and the second node are located in different time zones, and wherein combining the first set of requests and the second set of requests comprises converting the local timestamps associated with each request in the first set of requests and the second set of requests to a standard time zone.

16. The one or more non-transitory, computer-readable media of claim 14, the operations further comprising:
transmitting a notification indicating the first request and the second request to a user, the notification indicating to the user a time period for which the first node and the second node are prevented from processing the subsequent requests for the same record; and
receiving an input from the user that indicates the corrected sequence identifiers for the first request and the second request.

17. The one or more non-transitory, computer-readable media of claim 14, wherein the first request and the second request both originate from a same user that is authorized, by the first node and the second node respectively, to request modifications to the same record in the database.

18. The one or more non-transitory, computer-readable media of claim 17, wherein the first node and the second node are associated with different service regions of the database, the first request and the second request being routed to be processed at the first node and the second node respectively based on respective locations represented by client devices from which the first request and the second request originate.

19. The one or more non-transitory, computer-readable media of claim 14, the operations further comprising:
determining a new state of the same record based on (i) the corrected sequence identifiers for the first request and the second request and (ii) modified states of the same record specified by the first request and the second request; and
transmitting the new state of the same record to each of the first node and the second node.

20. The one or more non-transitory, computer-readable media of claim 14, wherein detecting the second request comprises detecting the second request of the second set of requests within a preconfigured time period of receiving the first request of the first set of requests, the preconfigured time period being less than a time interval in which the database is replicated across the first node and the second node.

* * * * *